United States Patent [19]

Harris et al.

[11] Patent Number: 5,179,063
[45] Date of Patent: Jan. 12, 1993

[54] HYDROTALCITE COMPOSITION

[75] Inventors: Jesse R. Harris; Gary A. Delzer; Randall A. Porter, all of Bartlesville, Okla.

[73] Assignee: Phillips Petroleum Company, Bartlesville, Okla.

[21] Appl. No.: 834,914

[22] Filed: Feb. 13, 1992

[51] Int. Cl.$^5$ .................. B01J 20/08; B01J 20/04; C02F 1/42

[52] U.S. Cl. ..................... 502/414; 210/683; 502/415

[58] Field of Search ............... 502/174, 176, 414, 415

[56] References Cited

U.S. PATENT DOCUMENTS

| | | | |
|---|---|---|---|
| 3,353,975 | 11/1967 | Shannon et al. | 106/65 |
| 4,284,762 | 8/1981 | Miyata et al. | 528/485 |
| 4,347,353 | 8/1982 | Miyata et al. | 528/485 |
| 4,458,030 | 7/1984 | Manabe et al. | 502/183 |
| 4,547,620 | 10/1985 | Miyata et al. | 585/852 |
| 4,642,193 | 2/1987 | Miyata et al. | 210/682 |
| 4,710,551 | 12/1987 | Miyata | 526/91 |
| 4,871,396 | 10/1989 | Tsujita et al. | 106/286.8 |
| 5,055,199 | 10/1991 | O'Neil et al. | 502/415 |

OTHER PUBLICATIONS

"DMT-4A: The Great Halogen Hunter", product brochure of Kyowa Chemical Industry Co., Ltd., Osaka, Japan, 1983.

"Comprehensive Inorganic Chemistry", vol. 2, by J. C. Bailas, Jr. et al., Pergamon Press, 1973, pp. 514-528.

*Primary Examiner*—Paul E. Konopka
*Attorney, Agent, or Firm*—K. K. Brandes

[57] ABSTRACT

A composition (being effective for removing chloride ions from liquids) comprises at least one hydrotalcite and 3-6 weight percent of at least one sodium polyphosphate. Preferably, this composition is prepared by a process comprising the step of calcining a mixture of at least one hydrotalcite and 3-6 weight percent of at least one sodium polyphosphate for about 10-20 hours at a temperature of about 370°-480° C.

14 Claims, No Drawings

HYDROTALCITE COMPOSITION

BACKGROUND OF THE INVENTION

In one aspect, this invention pertains to a composition comprising hydrotalcite and an inorganic binder. In another aspect, this invention pertains to a method of preparing a hydrotalcite/binder composition.

Hydrotalcites are well known materials and have been described in the patent literature, such as in U.S. Pat. Nos. 4,642,193, 4,547,620, 4,347,353 and 4,284,762. It is also known that these hydrotalcites can be used as halogen scavengers, in particular from polymer compositions and aqueous or organic liquids. Hydrotalcite particles can lose strength during these applications, especially when exposed to organic liquids. The present invention is directed to a hydrotalcite-containing composition which possesses high particle strength and high chloride absorption capacity, and is effective for removing chlorine-containing compounds from aqueous or organic liquids.

SUMMARY OF THE INVENTION

It is an object of this invention to provide a composition comprising hydrotalcite and an inorganic binder. It is another object of this invention to prepare a hydrotalcite/binder composition having high particle strength and being effective for removing chlorine-containing compounds from aqueous or organic liquids. Other objects and advantages will be apparent from the detailed description of this invention and the appended claims.

In accordance with this invention, a composition comprises at least one hydrotalcite and about 3-6 weight percent of at least one sodium polyphosphate. Also in accordance with this invention, a process for preparing a composition comprising at least one hydrotalcite and about 3-6 weight percent of at least one sodium polyphosphate comprises the step of calcining a mixture comprising said at least one hydrotalcite and said at least one sodium polyphosphate at a temperature of about 370°-480° C. for a time period of about 12-20 hours.

DETAILED DESCRIPTION OF THE INVENTION

Any hydrotalcite material can be used as the principal component of the composition in accordance with the present invention. The hydrotalcite can be a naturally occurring hydrotalcite or a synthetic hydrotalcite or a synthetic hydrotalcite-like compound or a mixture of any two or more than two of these materials. Preferred are the hydrotalcite materials described in U.S. Pat. Nos. 4,347,353 and 4,284,762. The presently more preferred hydrotalcite has a chemical formula of $Mg_{4.5}Al_2(OH)_{13}CO_3\cdot 3.5H_2O$. This preferred hydrotalcite material is manufactured by Kyowa Chemical Industry Company, Ltd., Osaka, Japan, and is marketed by Mitsui and Company, Ltd., Osaka, Japan, and by Mitsui and Company (USA), Inc., Houston, Tex., under the product designations of "DHT-4" and "DHT-4A".

The preferred hydrotalcite is a basic aluminum hydroxide carbonate hydrate having the chemical formula of $Mg_{4.5}Al_2(OH)_{13}CO_3\cdot 3.5H_2O$, a surface area (measured by $N_2$ adsorption in accordance with the BET method) of 5-15 $m^2/g$, a density of about 2.1 g/cc, and a Mohs hardness of 2-2.5. This hydrotalcite has a layered crystal structure with the following layer sequence: $OH^-$, $(Mg^{2+}, Al^{3+})$, $OH^-$, $(CO_3^{2-}, H_2O)$, wherein the distance between two successive $Mg^{2+}$ layers is about 7.61 angstroms and the distance between two successive $OH^-$ layers, located above and below a $(Mg^{2+}, Al^{+3})$ layer, is approximately 4.8 angstroms. The hydrotalcite generally loses about 0.3 weight-% when dried at 105° C. for 3 hours. Generally, this hydrotalcite is available as a white powder, about 96% of which has a particle size of less than 1 micrometer. Preferably, the hydrotalcite is dried at about 280°-320° C. for about 2-20 hours before it is employed in this invention.

Any sodium polyphosphate material which is substantially soluble in water can be used as the binder component of the composition in accordance with this invention. Suitable polyphosphates are described in "Comprehensive Inorganic Chemistry", by J. C. Bailar, Jr. et al., Volume 2, Pergamon Press, 1973, pages 514-528, and include sodium tripolyphosphate ($Na_5P_3O_{10}$), sodium tetrapolyphosphate ($Na_6P_4O_{13}$), sodium metaphosphates such as Maddrell's salt and Kurrol's salt, sodium tetrametaphosphate, sodium pentametaphosphate, sodium hexametaphosphate, sodium octametaphosphate, and higher linear sodium metaphosphates having the general formula of $(NaPO_3)_x$, with $x = 10-21$. Presently preferred is a linear sodium metaphosphate having the formula $(NaPO_3)_{13}$.

The composition in accordance with this invention comprises (preferably consists essentially of) hydrotalcite (preferably about 94-97 weight-%) and about 3-6 weight-% sodium polyphosphate. These two components can be combined in any suitable manner, such as by dry-blending in a suitable, conventional mixer. After the above-described components have been mixed (preferably by dry-blending), the mixture is generally shaped by extrusion or pelletizing or pilling or any other suitable, well-known shaping method. Preferably, enough water is added to the dry mixture to obtain a paste which can be extruded through a suitable die (preferably one having an inner diameter of about 1/32 inch). Generally, the weight ratio of added water to the dry mixture of hydrotalcite and sodium polyphosphate is in the range of about 0.4:1 to about 0.6:1. After the pasty mixture (containing hydrotalcite, sodium polyphosphate and water has been shaped, it is substantially dried (preferably at a temperature of about 100°-150° C. for about 1-60 hours), and then calcined (preferably in air) for about 10-20 hours at about 370°-480° C., preferably for about 14-18 hours at 390°-460° C., more preferably for about 15-17 hours at about 400°-450° C.

The thus-prepared composition comprising hydrotalcite and sodium polyphosphate can be used for removing chlorine-containing compounds, in particular ionic metal chlorides, more preferably, NaCl, from aqueous solutions or from organic liquids (such as aliphatic alcohols, glycol compounds and the like) which contain these chlorine compounds in small amounts (generally about 0.002-0.2 weight percent $Cl^-$) as impurities. A particularly useful application of the composition of this invention is to treat a hexanol/N-methyl-2-pyrrolidone/$H_2O$ solution (with n-hexanol generally being present at a concentration of more than 50 weight percent) which contains about 0.005-0.1 weight-% $Cl^-$ (present as dissolved NaCl). Such a solution is formed in a manufacturing process for producing poly(phenylene sulfide) in the presence of N-methyl-2-pyrrolidone (NMP). NMP is generally recovered from a produced slurry of the phenylene sulfide polymer in an aqueous brine by liquid-liquid extraction with n-hexanol. The formed n-hexanol/NMP extract contains undesirably high amounts of NaCl, which must be removed from the extract before any further separation (e.g., by fractional distillation). The composition of this invention is successfully employed for scavenging Cl$^-$ (as NaCl) from this extract by contacting it under suitable conditions, generally at a temperature of about 30°–80° C. for about 0.2-2 hours.

The following examples are presented to further illustrate the invention, and are not to be construed as unduly limiting the scope of this invention.

EXAMPLE I

This example illustrates the effects of binder content and calcination conditions on the crush strength of particles comprising hydrotalcite and sodium metaphosphate binder.

80 grams of DHT-4 hydrotalcite (provided by Mitsui and Company, Osaka, Japan) and various amounts of a sodium metaphosphate, $(NaPO_3)_{13}$, as binder (provided by Fisher scientific Company, Pittsburgh, PA) were dry-blended. The amounts of the sodium metaphosphate binder were chosen so as to provide binder contents in the blend ranging from 1.5 to 6 weight-% sodium phosphate. Water was mixed with the dry blend of hydrotalcite and sodium metaphosphate (generally at a water:solids weight ratio of about 0.5:1) so as to make a paste, which was then extruded through a 1/32 inch die. The extrudates were dried at room temperature and then at about 125° C. for 2 days. The dry extrudates were then calcined in air at various temperatures for various periods of time.

The calcined extrudate pieces of a particular hydrotalcite/Na-metaphosphate blend were then submerged in a liquid mixture (obtained from a polyphenylene sulfide pilot plant) containing 73 weight-% n-hexanol, 12.6 weight-% water, 14.4 weight-% N-methyl-2-pyrrolidone (NMP) and 152 ppm NaCl (i.e., 152 parts of NaCl by weight per million parts by weight of the total mixture). The extrudate pieces were stirred for 50 minutes in above-described liquid mixture at a temperature of 65° C. Thereafter, the slurry was filtered, and the extrudates were dried at 120° C. for about 16 hours. About 15 dried extrudate pieces from each test batch were tested in a conventional laboratory pistol grip crush strength apparatus being equipped with metal plates of ⅛ inch diameter and a 0–30 lb. force gauge. The force required to crush an extrudate particle placed between the two plates was recorded. Average crush strengths of 15 extrudate pieces of each of the various calcined hydrotalcite/Na-metaphosphate blends are summarized in Table I.

TABLE I

| Wt-% Binder | Calcination Temp. (°C.) | Calcination Time (Hrs.) | Crush Strength (lb.) |
|---|---|---|---|
| 1.5 | 450 | 16 | ≦1 |
| 3.0 | 450 | 16 | 12.3 |
| 3.0 | 450 | 16 | 12.5 |
| 6.0 | 300 | 16 | ≦1 |
| 6.0 | 400 | 16 | 20.0 |
| 6.0 | 450 | 1 | ≦1 |
| 6.0 | 450 | 16 | 11.5 |
| 6.0 | 450 | 50 | ≦1 |
| 6.0 | 525 | 16 | ≦1 |
| 6.0 | 900 | 16 | ≦1 |

Test data of Table I demonstrate that only the test particles containing about 3-6 weight-% sodium metaphosphate binder which had been calcined at about 400°–450° C. for about 16 hours had acceptable crush strength (after having been contacted at 65° C. with the n-hexanol/H$_2$O/NMP mixture, as described above).

EXAMPLE II

This example illustrates the effectiveness of the hydrotalcite/Na-metaphosphate particles of this invention for removing chloride ions from liquids.

Blends of DHT-4 hydrotalcite (described above) and various amounts of Na metaphosphate binder (described above) were mixed with enough water to prepare a paste which was dried at room temperature for about 16 hours and then at 125° C. for about 16 hours. The dried material was ground and sieved. A 20-40 mesh fraction of each test batch was calcined for 16 hours at various temperatures. 3.0 grams of a particular calcined blend was then stirred at 65° C. with 250 mL of an aqueous NaCl solution containing about 500 ppm Cl$^-$. Test results indicated that after 25-50 minutes of contact at 65° C., the calcined particles (in accordance with this invention) containing 3-6 weight-% sodium metaphosphate binder (having been calcined at 450° C. for 16 hours) had removed about 50-60% Cl$^-$ from the aqueous solution. By contrast, the material which contained 1.5 weight-% and 12 weight-%, respectively, of sodium metaphosphate binder (also having been calcined at 450° C. for 16 hours) had removed only about 18% Cl$^-$ and respectively, from the aqueous NaCl solution.

In another test series, 3.0 gram samples of calcined, 10-20 mesh hydrotalcite/Na-metaphosphate particles were treated at 65° C. under a N$_2$ atmosphere with 250 mL of the liquid described in Example I, which contained 73.0 weight-% n-hexanol, 14.4 weight-% NMP, 12.6 weight-% H$_2$O and 152 ppm NaCl (equivalent to 92 ppm Cl$^-$). Test results indicat that the materials in accordance with this invention, which contained 3-6 weight-% sodium metaphosphate binder and had been calcined for about 16 hours at 450° C., had removed about 50-70% of Cl$^-$ from the liquid n-hexanol/NMP/H$_2$O mixture within a period of time of 5-50 minutes.

Reasonable variations, modifications and adaptations for various usages and conditions can be made within the scope of the disclosure and the appended claims, without departing from the scope of this invention.

That which is claimed is:

1. A process for preparing a composition of matter consisting essentially of about 94-97 weight-% of at least one hydrotalcite and about 3-6 weight-% of at least one sodium polyphosphate comprising the steps of mixing said at least one hydrotalcite and said at least one sodium polyphosphate, and calcining the obtained mixture for about 10-20 hours at a temperature of about 370°–480° C.

2. A process in accordance with claim 1, wherein said at least one hydrotalcite has the chemical formula of $Mg_{4.5}Al_2(OH)_{13}CO_3.3.5H_2O$ and said at least one sodium polyphosphate is a water-soluble linear sodium metaphosphate of the formula $(NaPO_3)_x$, with x being in the range of about 10 to 21.

3. A process in accordance with claim 1, wherein said at least one hydrotalcite has the chemical formula of $Mg_{4.5}Al_2(OH)_{13}CO_3.3.5H_2O$ and said at least one sodium polyphosphate is a water-soluble linear sodium metaphosphate having the chemical formula of (NaPO$_3$)$_{13}$.

4. A process in accordance with claim 3, wherein water is added to a dry mixture of about 94-97 weight-% of said at least one hydrotalcite and about 3-6 weight-% of said at least one sodium polyphosphate so as to obtain a pasty mixture.

5. A process in accordance with claim 4, wherein the weight ratio of added water to said dry mixture is in the range of about 0.4:1 to about 0.6:1.

6. A process in accordance with claim 4 further comprising the steps of extruding said pasty mixture and drying the obtained extrudates before said calcining.

7. A process in accordance with claim 6, wherein said drying is carried out for about 1-60 hours at about 100°-150° C., and said calcining is carried out for about 14-18 hours at about 390°-460° C.

8. A process in accordance with claim 1, wherein said calcining is carried out for about 14-18 hours at about 390°-460° C.

9. A process in accordance with claim 8, wherein said calcining is carried out for about 15-17 hours at about 400°-450° C.

10. A composition of matter obtained by the process of claim 1.

11. A composition of matter obtained by the process of claim 2.

12. A composition of matter obtained by the process of claim 3.

13. A composition of matter obtained by the process of claim 6.

14. A composition of matter obtained by the process of claim 8.

* * * * *